No. 816,157. PATENTED MAR. 27, 1906.
C. C. DOTSON.
WRENCH.
APPLICATION FILED JUNE 16, 1905.
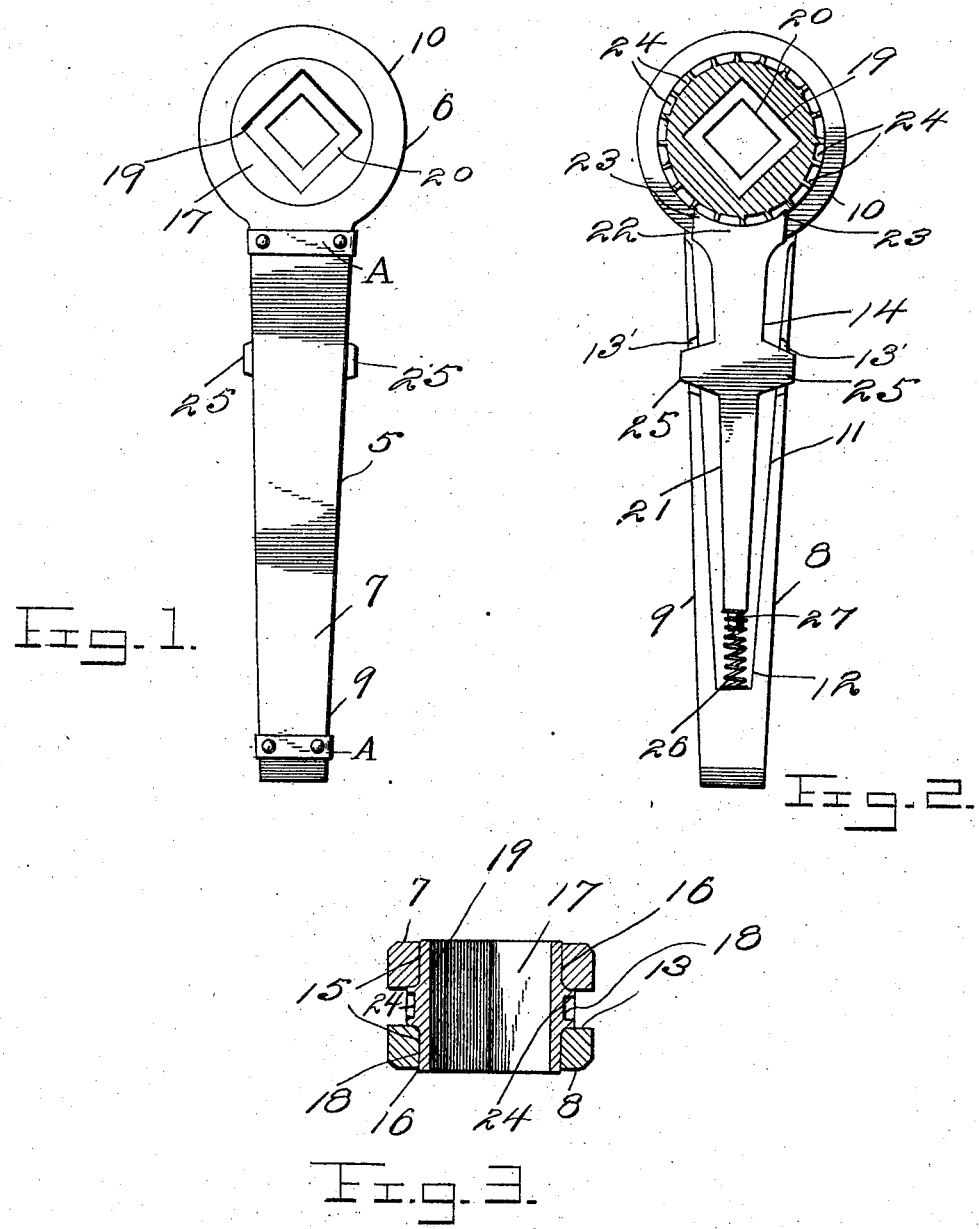
Witnesses
Inventor
C. C. Dotson
By Chandler & Chandler
Attorneys

UNITED STATES PATENT OFFICE.

CHRISTOPHER C. DOTSON, OF HUZZAH, MISSOURI.

WRENCH.

No. 816,157.　　　　Specification of Letters Patent.　　　　Patented March 27, 1906.

Application filed June 16, 1905. Serial No. 265,565.

*To all whom it may concern:*

Be it known that I, CHRISTOPHER C. DOTSON, a citizen of the United States, residing at Huzzah, in the county of Crawford, State of Missouri, have invented certain new and useful Improvements in Wrenches; and I do hereby declare the following to be a full, clear, and exact description of the invention, such as will enable others skilled in the art to which it appertains to make and use the same.

This invention relates to wrenches, and more particularly to ratchet-wrenches, and has for its object to provide a wrench which while being extremely simple and cheap will operate in an efficient manner.

Another object is to provide a wrench including few parts.

Other objects and advantages will be apparent from the following description, and it will be understood that changes in the specific construction shown and described may be made within the scope of the claims and that any suitable materials may be used without departing from the spirit of the invention.

In the drawings forming a portion of this specification, and in which like characters of reference indicate similar parts in the several views, Figure 1 is an elevation of the present wrench. Fig. 2 is a view showing one of the sections removed and illustrating the other section and the dog in elevation, the rotatable member being in section. Fig. 3 is a transverse section through the head of the wrench.

Referring now to the drawings, the present wrench comprises a handle 5, having a circular head 6 at one end, the wrench consisting of two castings 7 and 8. Each of the castings comprises a stem 9, having a disk 10 at one end, and at the disk end the castings are somewhat reduced in thickness, the reduced portion extending slightly into the stem. Formed in the unreduced portion of the stem of each of the castings there is a recess 11, which opens through the end of this unreduced portion adjacent to the disk, and the two castings are disposed with their recessed faces against each other, the recesses registering to form a longitudinally-extending chamber 12 in the handle of the wrench, the latter being formed by the stems of the castings, which are secured together by bands A or in any suitable manner. The disks 10 form the head of the wrench, and by reason of the fact that the disk portions of the castings are reduced in thickness the disks lie in spaced relation, as shown at 13, and at one end the chamber 12 communicates with the space 13, as will be readily understood.

Laterally-extending registering openings are formed in the sides of the handle 5 adjacent to the head, one-half of each of these openings being formed in the stem of each casting, and these openings communicate with the chamber 12. As shown, the chamber terminates short of the free end of the handle, and disposed in this chamber there is a dog 14, which will be presently described. Registering openings 15 are formed through the disks, and revolubly mounted in these openings are the end portions 16 of a member 17, having a central peripherally-notched flange 18, lying in the space 13. This member has a passage 19, adapted for the reception of nut-receiving bushings 20.

The dog 14 comprises a central shank 21, having a laterally-extending head 22 at one end provided with projections 23 at its ends extending into the space 13 and adapted for engagement in the notches of the member 17, these notches being indicated at 24. The shank 21 carries laterally-extending finger-pieces 25, which project outwardly through the openings 13', and a helical spring 26 is engaged between the bottom of the chamber 12 and the adjacent end of the shank, this end of the shank being reduced, as shown at 27, for engagement in the spring.

The dog is susceptible of some longitudinal movement within the chamber 12, and the helical spring holds the dog yieldably against the member 17 to take up for wear of the projections 23 or the member 17. The dog is also movable laterally within the chamber and may be moved by pressing upon the finger-pieces 25, and it will be seen that when the dog is moved in one direction laterally one of the projections 23 will be moved out of engagement with the member 17 to permit of rotation of this member in one direction, while through movement of the dog in the opposite direction the other projection will be moved out of engagement with the member, which may then be oppositely rotated.

What is claimed is—

1. A wrench comprising a handle, a head carried by one end of the handle and including spaced portions, registering openings formed in the spaced portions, a member revolubly mounted in the openings, a body-engaging device carried by the member, said member having a notched portion between the spaced portions of the head, said handle having a longitudinal chamber therein communicating with the space between the portions of the head, a dog engaged in the chamber for longitudinal movement toward and away from the member, said dog having spaced projections adapted for engagement with the notches of the member to hold the member against rotation, means for holding the dog yieldably at the limit of its movement in the direction of the member, said dog being movable laterally to bring its projections into and out of engagement with the member interchangeably, and finger-pieces carried by the dog and extending outwardly of the stem, said finger-pieces being adapted to receive pressure thereagainst to move the dog both laterally and longitudinally.

2. A wrench comprising a handle, a head carried by one end of the handle and including spaced portions, said handle and head being formed of two castings disposed against each other, the castings having recesses in their mutually-adjacent faces to form a longitudinal chamber in the handle, said chamber communicating with the space between the portions of the head, a body-engaging member revolubly mounted in the head and having a peripherally-notched flange extending into the space between the portions of the head, a dog disposed in the passage and having projections adapted for interchangeable engagement with the notches of the flange, said dog being shiftable laterally to bring its projections into and out of engagement with the notches, finger-pieces carried by the dog and extending outwardly of the handle for movement of the dog laterally, and removable attaching devices carried by the castings, said castings being separable to permit of a removal of the dog and the body-engaging member.

In testimony whereof I affix my signature in presence of two witnesses.

CHRISTOPHER C. DOTSON.

Witnesses:
JOHN PHELAN,
W. J. PARKER.